United States Patent [19]

Polizzotti

[11] Patent Number: 4,929,361
[45] Date of Patent: May 29, 1990

[54] METHOD OF INHIBITING FOULING IN PROTEIN-CONTAINING FLUIDS

[75] Inventor: David M. Polizzotti, Yardley, Pa.

[73] Assignee: Betz Laboratories, Inc., Trevose, Pa.

[21] Appl. No.: 357,145

[22] Filed: May 25, 1989

[51] Int. Cl.$^5$ .............................................. C02F 5/10
[52] U.S. Cl. ..................................... 210/698; 127/68; 203/7
[58] Field of Search ................ 210/696, 698; 252/180, 252/DIG. 1; 127/65, 68, 61, 16; 203/6, 7; 159/DIG. 13; 426/271

[56] References Cited

U.S. PATENT DOCUMENTS

| | | | |
|---|---|---|---|
| 1,918,812 | 7/1933 | Kerr et al. | 435/267 |
| 3,061,478 | 10/1962 | Kent | 127/61 |
| 3,362,829 | 1/1968 | Landfried et al. | 99/14 |
| 3,476,598 | 11/1969 | Sanders | 127/61 |
| 3,483,033 | 12/1969 | Casey | 127/61 |
| 3,578,589 | 5/1971 | Hwa et al. | 252/180 |
| 3,880,824 | 4/1975 | Roa et al. | 260/112 |
| 3,962,119 | 6/1976 | Cosentino | 252/351 |
| 4,440,792 | 4/1984 | Bradford et al. | 210/698 |
| 4,452,703 | 6/1984 | Ralston et al. | 210/698 |

*Primary Examiner*—Peter Hruskoci
*Assistant Examiner*—Krisanne Shideler
*Attorney, Agent, or Firm*—Steven D. Boyd; Alexander D. Ricci

[57] ABSTRACT

Methods for controlling the formation of proteinaceous fouling deposits in high temperature evaporators and concentrators as employed in processing steepwater in the wet milling of corn. The methods comprise adding a surfactant, preferably a nonionic surfactant to the steepwater. Particularly effective surfactants are oxyalkylated sorbitan R surfactants where R is monooleate, trioleate, monostearate, tristearate, monopalmitate and monolaurate.

8 Claims, 2 Drawing Sheets

METHOD OF INHIBITING FOULING IN PROTEIN-CONTAINING FLUIDS

FIELD OF THE INVENTION

The present invention is directed to a method for controlling organic deposition on heat transfer surfaces. More specifically, the present invention is directed to the use of surfactants, and in particular nonionic surfactants, to control organic deposition in high temperature evaporators as employed for concentrating steepwater in the wet milling of corn.

BACKGROUND OF THE INVENTION

The present invention relates to the control of fouling by protein-containing fluids in equipment used in the wet milling of corn. The wet milling processing of shelled corn is employed to obtain staple products such as corn oil, dextrose, corn syrup, high fructose corn syrup, dextrins, dry starches and feeds. The principle steps in the wet milling of corn include steeping, milling, recovering and processing. During the steeping operation, corn kernels are softened by soaking in a hot, dilute solution of sulfurous acid (i.e., water/sulfur dioxide). The softened kernels are then passed through grinding mills and separators where the germ is removed and the starch and gluten are separated from the coarser hull and fibers. The starch is then separated from the gluten which is added to the fibrous material and processed into a high protein animal feed. The starch is recovered as dry starch or further processed into dextrose and fructose. The sulfurous acid steepwater initially used to soften the corn contains solubles which are recovered for use in feeds. The steepwater solids are recovered by evaporation and drying. The solids recovered from evaporating and drying the steepwater are used as additives to live stock feeds to enhance their nutritional value.

The deposition of organic, proteinaceous materials in the steepwater evaporators limits throughput and is a bottle-neck in the wet milling corn process. To cope with such organic deposition fouling, such evaporators are typically boiled out with an acid and/or caustic solution. Such boil-out procedures result in undesirable downtime for the equipment. The present invention is directed to a process for controlling deposition in such evaporators so as to minimize the requirement for such boil-out procedures.

The use of surfactants to control particle adhesion and cohesion of proteinaceous materials such as wheat gluten is known. U.S. Pat. No. 3,362,829 discloses a process for coating powdered vital wheat gluten with a nonionic hydrophilic lipid selected from the class consisting of monoglycerides, salts of lactylic esters of fatty acids, polyoxyethylene stearate and stearyl monoglyceridyl citrate. The coating of the powdered wheat gluten with such nonionic hydrophilic lipids is disclosed as controlling wetting of the vital wheat gluten thereby controlling cohesion of the gluten upon hydrogenation. The use of polyoxyethylene sorbitan monostearate in combination with the hydrophilic lipids is also disclosed. The surface active agent, i.e., polyoxyethylene sorbitan monostearate is included as an aid for the initial dispersion of the vital wheat gluten and has no inhibiting effect on coalescence of the vital wheat gluten. The process of hydrating vital wheat gluten described in U.S. Pat. No. 3,362,829 is typically carried out at neutral pH and relatively low temperatures so as to not substantially denature the gluten.

U.S. Pat. No. 3,880,824 discloses a gluten/lipid complex and process for preparing a gluten/lipid complex in which vital wheat gluten complexes with lipids are prepared which are resistant to particle cohesion. The finely divided vital wheat gluten is reacted with ionic and nonionic fatty substances selected from the group consisting of fatty acid chlorides, fatty monoglycerides, lactylic esters of fatty acids, phospholipids and sorbitan fatty acid esters in the presence of a mild base catalyst. The phospholipids and lactylic esters of fatty acids yield comparable complexes in an acidic environment.

U.S. Pat. No. 1,918,812 discloses a treatment for steepwater from a wet corn milling operation which minimizes scale in the steepwater evaporators. The process comprises "incubating" the steepwater to allow natural organisms and/or enzymes to convert the scale forming substances into non-scale forming substances. A carbohydrate may be added to the steepwater which may also be agitated or aerated to hasten the desired effect of the organisms and/or enzymes.

An additive to control scale formation in evaporators used in the concentration of cane and beet sugar is disclosed in U.S. Pat. No. 3,483,033. The additive is a composition containing a hydrolyzed polyacrylamide and a protective colloid such as sodium alginate or carboxymethylcellulose and preferably one or more of (1) EDTA or disodium methylene diamine tetraacetic dihydrate, (2) a gluconate, and (3) a polyphosphate. The composition is added to sugar juice after clarification and before the evaporators to control scale deposition in the evaporators.

SUMMARY OF THE INVENTION

Figure 1:
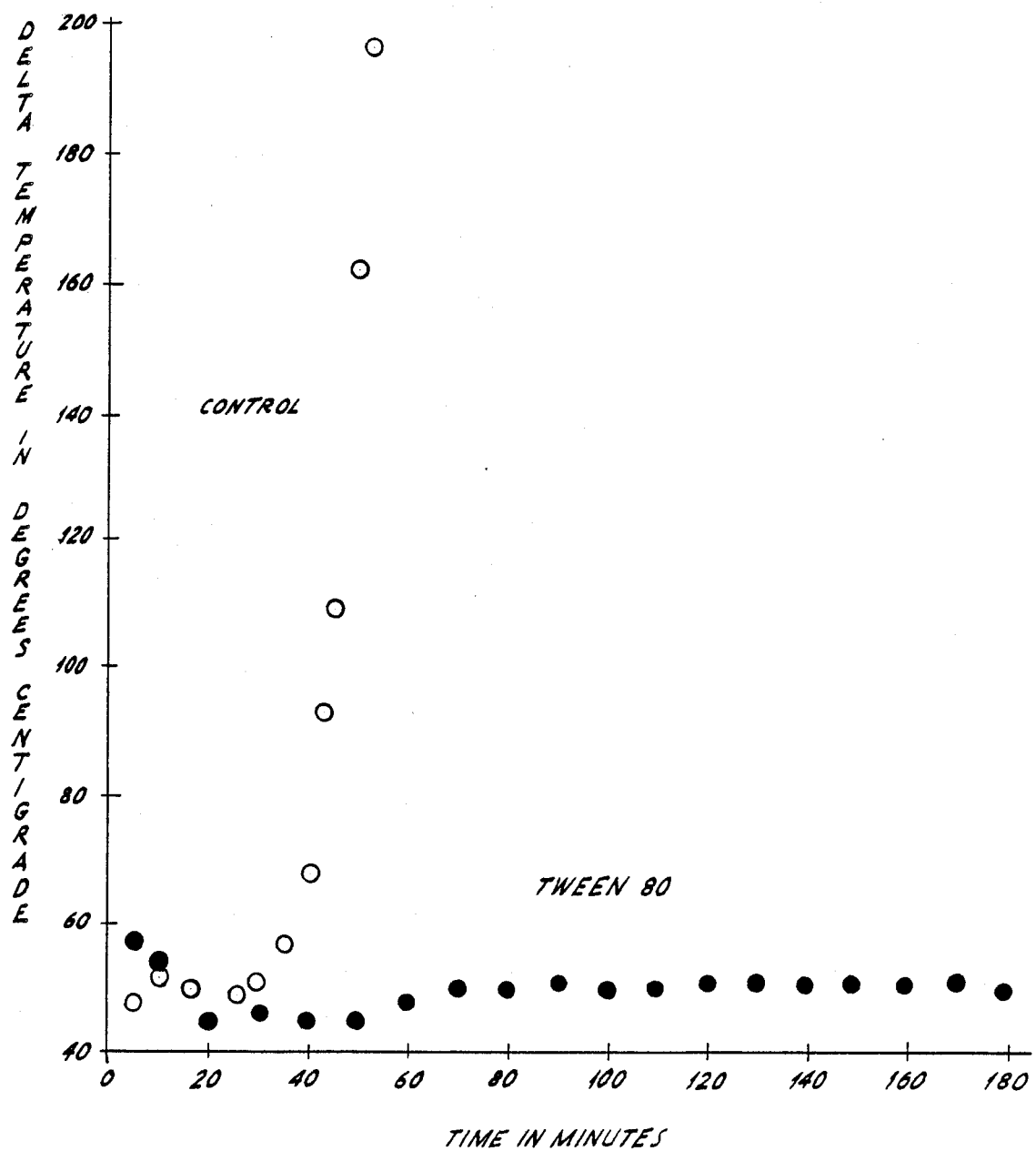
FIGS. 1 and 2 are graphs of the change in temperature in degrees centigrade vs. time in minutes as described herein below.

The present invention provides a process to control fouling of the evaporators and concentrators employed to concentrate hot, acidic steepwater in a corn wet milling operation. Typically, such steepwater has a pH below about 4.0 due to the use of sulfurous acid in the hot steeping operation. The present inventor discovered that in hot, acidic steepwater evaporators and concentrators, the addition of a surfactant, preferably a nonionic surfactant, effectively inhibits the formation of fouling deposits. Particularly effective at inhibiting such fouling deposits are oxyalkylated sorbitan R surfactants where R is monooleate, trioleate, monostearate, tristearate, monopalmitate, and monolaurate.

It was also discovered that the addition of the surfactants to the steepwater also greatly reduce bumping in the process equipment. The bumping occurs in fluids when a vapor film builds up along an interface between a heated surface and a fluid being heated. The vapor film which forms at the interface can become trapped due to the composition, viscosity and/or velocity of the fluid adjacent to the heated surface. Because the vapor barrier is a poor thermal conductor, the captive vapor continues to be heated until it finally explodes or "bumps" away from the heated surface. Steep-water treated in accordance with the present invention has exhibited reduced bumping in an experimental apparatus which simulates conditions in steepwater evaporators.

DETAILED DESCRIPTION OF THE PREFERRED EMBODIMENTS

The present inventor discovered that surfactants and more particularly nonionic surfactants effectively inhibit the formation of fouling deposits in steepwater evaporators. Typically, the steeping operation in wet corn milling employs a hot, aqueous sulfurous acid solution which results in a steepwater pH below about 4.0. Conventionally, the steepwater evaporators and condensers employed in a corn wet milling operation were prone to fouling. The heat transfer surfaces of the evaporators and condensers are fouled by the deposition of organic materials from the steepwater. Such fouling was conventionally removed by an acid and/or caustic boil-out process. Such boil-out processes result in production losses, increased wear on the evaporator tubing and increased cost for boil-out chemicals, manpower and steam.

The present invention provides a process for controlling fouling of steepwater evaporators which minimizes the necessity of such boil-out operations. The process of the present invention comprises the addition of a surfactant, preferably a nonionic surfactant to the steepwater prior to introduction into the evaporators and condensers.

The preferred surfactants in the process of the present invention are nonionic surfactants, particularly oxyalkylated sorbitan fatty acids. Representative surfactants are those surfactants marketed by ICI America under the Tween label. The Tween surfactants are polyoxyethylene 20 sorbitan R surfactants with R being a fatty acid moiety. The general structure of the polyoxyethylene 20 sorbitan R is:

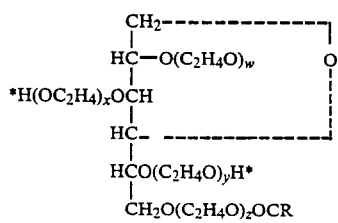

where $w+x+y+z$ equals 20. When R equals monooleate the material is Tween 80 (polysorbate 80). When R equals trioleate the material is Tween 85. When R equals monostearate the material is Tween 60 and 61. When R equals monopalmitate the material is Tween 40. When R equals monolaurate the material is Tween 20 and 21. For triesters, the hydrogens marked with an asterisk are replaced by RCO—.

It is also believed that sugar modified surfactants such as octaglycerol monooleate or polyglycerol ester would also be effective. Such polyglycerol esters are known to be effective replacements for polysorbates.

EXAMPLE

The effectiveness of the present invention at inhibiting fouling was determined in an apparatus which simulates the conditions in a steepwater evaporator. The invention will now be further described with reference to a number of specific examples which are to be regarded as illustrative and not as restricting the scope of the invention.

TEST METHOD UTILIZED

The test method employed a heated stainless steel probe suspended in a circulating stream of heated steepwater. The growth of fouling deposits on such a heated surface is not linear with time. As the fouling deposit grows, and the fluid temperature is held constant, the temperature of the probe surface increases to compensate for the resistance to heat transfer caused by the deposition. The temperature increase over time of the probe surface is a measure of the degree of fouling. In the testing, temperature change over time of the stainless steel probe was measured. In addition to monitoring temperature behavior, the weight of the deposit that accumulated on the heated probe and length of the time of the experiment were recorded.

FIG. 1 is a graph of the effects of Tween 80 (polyoxyethylene 20 sorbitan monooleate) added to evaporator steepwater. As shown, the untreated control fouled rapidly as indicated by the change in temperature of 196° C. for the probe over 53 minutes. 7.1 grams of deposit accumulated on the probe over this time span. When the steepwater was treated with 500 parts per million Tween 80, the probe temperature increased 5° C. over a 2½ hour period and only 1.55 grams of deposits accumulated. These experimental numbers allow a ½ hour stabilization period before determination of the temperature change.

Figure 2:
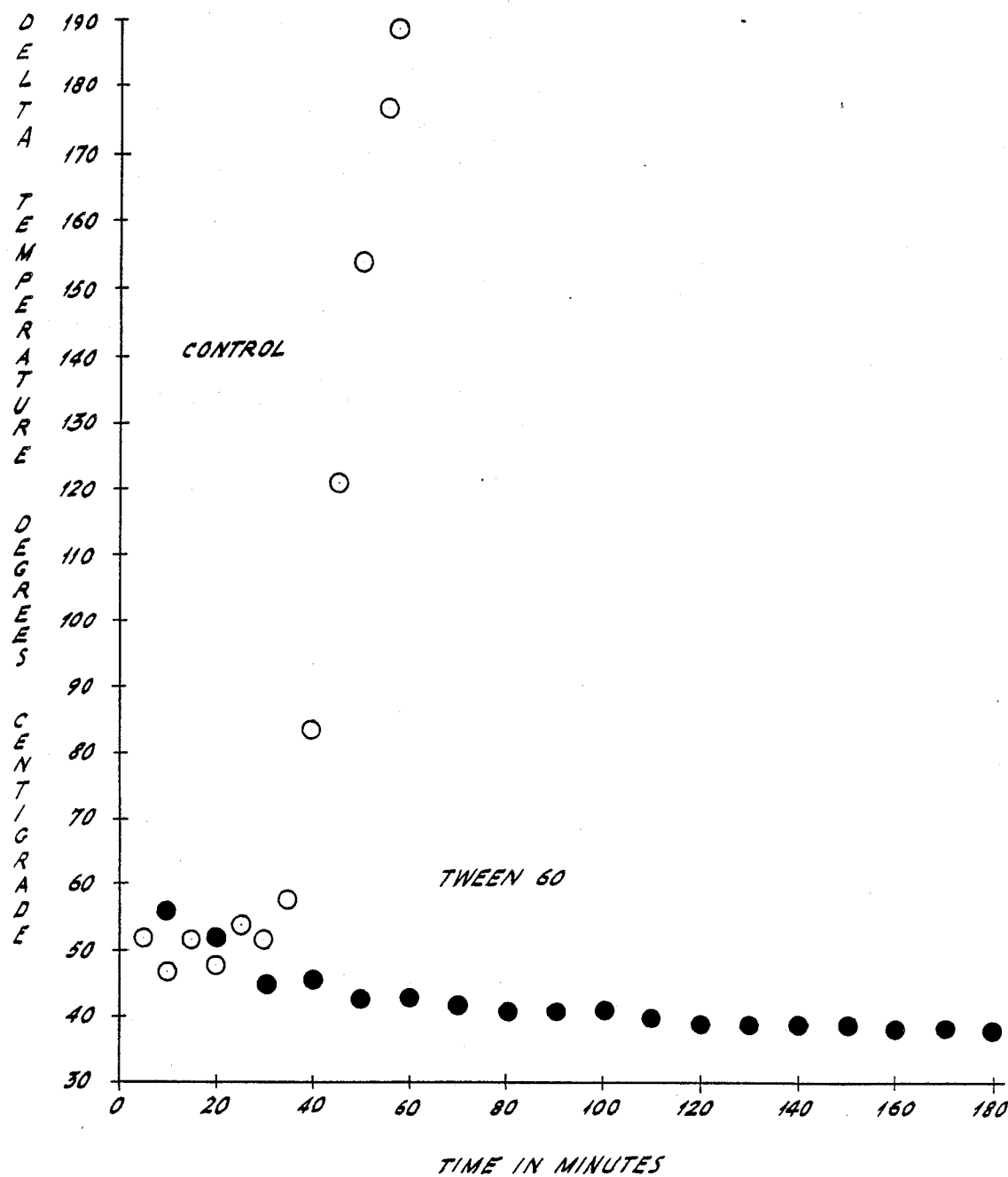

FIG. 2 is a graph of the effects of Tween 60 (polyoxyethylene 20 sorbitan monostearate) added to evaporator steepwater. As shown, the untreated control steepwater fouled rapidly as indicated by the change in temperature of 189° C. over a period of 57 minutes. 7.15 grams of deposition accumulated on the probe in this time span. When the steepwater was treated with 500 parts per million Tween 60, the probe temperature decreased 18° C. over a period of 2½ hours and only 1.058 grams of deposit accumulated on the probe. The reported results allow a ½ hour stabilization period for the system before the temperature change was determined.

As can be seen from FIGS. 1 and 2, the addition of a nonionic surfactant to aqueous acidic wet corn milling steepwater has a profound effect on the fouling and deposition on a heated surface as measured by the change in the temperature of the heated surface over time.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A process for controlling organic fouling of heat transfer surfaces exposed to an aqueous, acidic proteinaceous solution which comprises adding to said solution an effective inhibiting amount of a nonionic surfactant.

2. The process of claim 1, wherein said proteinaceous solution is a wet corn milling steepwater having a pH below about 4.0.

3. The process of claim 1 wherein said nonionic surfactant is a polyoxyethylene 20 sorbitan R surfactant wherein R is selected from the group consisting of monooleate, trioleate, monostearate, tristearate, monolaurate and monopalmitate.

4. A process for controlling organic fouling of heat transfer surfaces exposed to aqueous, acidic wet corn milling steepwater which comprises adding to said steepwater an effective inhibiting amount of a nonionic surfactant.

5. The process of claim 4 wherein said nonionic surfactant is a polyoxyethylene 20 sorbitan R surfactant wherein R is selected from the group consisting of monooleate, trioleate, monostearate, tristearate, monolaurate and monopalmitate.

6. The process of claim 4 wherein said acidic wet corn milling steepwater has a pH below about 4.0.

7. The process of claim 4 wherein said acidic wet corn milling steepwater has a pH below about 4.0.

8. A process for controlling organic fouling of heat transfer surfaces exposed to acidic wet corn milling steepwater which comprises adding to said steepwater an effective inhibiting amount of a polyoxyethylene 20 sorbitan R surfactant wherein R is selected from the group consisting of monooleate, trioleate, monostearate, tristearate, monolaurate and monopalmitate.

* * * * *